(12) United States Patent
St.-Germain

(10) Patent No.: US 7,425,798 B2
(45) Date of Patent: Sep. 16, 2008

(54) INTELLIGENT LIGHT DEGRADATION SENSING LED TRAFFIC SIGNAL

(75) Inventor: Nicolas St.-Germain, Saint-Bruno (CA)

(73) Assignee: Lumination LLC, Valley View, OH (US)

( * ) Notice: Subject to any disclaimer, the term of this patent is extended or adjusted under 35 U.S.C. 154(b) by 0 days.

(21) Appl. No.: 11/093,391

(22) Filed: Mar. 30, 2005

(65) Prior Publication Data
US 2005/0206529 A1 Sep. 22, 2005

Related U.S. Application Data

(63) Continuation-in-part of application No. 10/762,743, filed on Jan. 22, 2004, now abandoned.

(60) Provisional application No. 60/442,082, filed on Jan. 23, 2003.

(51) Int. Cl.
H05B 37/02 (2006.01)
(52) U.S. Cl. ........................ 315/129; 315/130
(58) Field of Classification Search ........... 340/815.45, 340/907; 315/191, 362, 129, 130, 131, 134, 315/291, 119; 372/31
See application file for complete search history.

(56) References Cited

U.S. PATENT DOCUMENTS 5,019,769 A * 5/1991 Levinson ................ 372/31
5,581,173 A * 12/1996 Yalla et al. .............. 323/257
6,078,148 A * 6/2000 Hochstein ............... 315/291
6,127,784 A 10/2000 Grossman
6,153,985 A 11/2000 Grossman
6,236,331 B1 5/2001 Dussureault
6,448,716 B1 9/2002 Hutchison
6,577,080 B2 * 6/2003 Lys et al. ................ 315/362
6,667,623 B2 12/2003 Bourgault
6,963,175 B2 * 11/2005 Archenhold et al. ..... 315/291
2003/0015973 A1 * 1/2003 Ovens et al. ............ 315/291

FOREIGN PATENT DOCUMENTS

EP 1 098 550 A 5/2001

* cited by examiner

Primary Examiner—Wilson Lee
Assistant Examiner—Hung Tran Vy
(74) Attorney, Agent, or Firm—Fay Sharpe LLP

(57) ABSTRACT

The inventive signal incorporates an intelligent diagnosis module inside a light emitting diode (LED) signal, such as an LED traffic signal. The inventive signal can self-extinguish or send a signal through its communication port at the end of its useful life when the LEDs are no longer providing the required light output. Additionally, the inventive signal sends a signal to increase the current as the LEDs degrade to ensure the light output is above a threshold minimum.

23 Claims, 2 Drawing Sheets

INTELLIGENT LIGHT DEGRADATION SENSING LED TRAFFIC SIGNAL

This application is a CIP of U.S. application Ser. No. 10/762,743 filed 22 Jan. 2004 now abandoned entitled Intelligent LED Traffic Signal Modules that claimed the benefit of U.S. Provisional Application No. 60/442,082 filed 23 Jan. 2003.

BACKGROUND OF THE INVENTION

The present invention related to LED traffic signals. More particularly, it relates to an intelligent self-diagnosing traffic signal that identifies the end of the useful life of the signal.

1. Field of the Invention
2. Description of Related Art

Light Emitting Diodes (LEDs) traffic signals usage is wide spread. LEDs offer interesting advantages over incandescent lights. Those advantages include, for example, low power consumption and long life.

While LEDs last for a very long time (typical meantime between failure or MTBF is in the millions of hours), their light output intensity degrades over time. Manufacturers generally warranty their LED products for a certain period of time (typically 5 years). Depending on the operating conditions, including ambient temperature and signal duty cycle, the signal light output might be satisfactory for a period exceeding the warranty period. Users would like to use the LED signal until it reaches the end of its useful life; however because faulty traffic signals can result in an unsafe road condition, signals are required to have sufficient light output. One approach is to replace all signals upon warranty expiration. However, this results in signals being replaced while there is still significant useful life left in them. Another approach is to have the lamp measured in a lab at and/or after warranty expiration to assess the signal's condition. This only provides information at a particular moment in time and does not provide on-going data about the condition of the lamp. There is a need for an intellig3ent self-diagnosing traffic signal that allows users to make use of the long life of the LEDs without compromising safety.

U.S. application Ser. No. 10/762,743 is herein incorporated in its entirety. The LED signal has a communication link with a traffic controller. It receives commands and provides feedback information to the traffic controller. In the present invention, the signal is a stand-alone system. The traffic controller feeds voltage, but the signal does not have any additional interface with it.

U.S. Pat. No. 6,667,623 is also incorporated in its entirety. A system to monitor light output degradation is disclosed. The invention in U.S. Pat. No. 6,667,623 uses a light sensor to detect end of life. The proposed invention compiles a database of the various parameters (temperature, hours of operation, light output etc) in order to more accurately assess the signal's end of life and adjust the LED current to extend the signal's life.

A prior art method to change the LED current in response to a sensor's output uses a variable load in parallel with the LEDs. In the present invention, there is no variable load; current is directly adjusted by the power supply. One prior art signal utilizes a compensation circuit based on light output feedback from a photosensor. The present invention uses the photosensor feedback primarily in order to detect end of life of the signal and to compensate light output by increasing LED current as long as it is in the permissible range in order to extend the signal's life. The present invention also has communication capabilities.

An alternative prior art method senses the light output of an extra LED and adjusting the power supply according to the light output generated by the extra LED. The present invention measures the light output for the complete array, calculates the number of hours of operation and determine end of life.

A prior art system predicts when light output will fall under predetermined threshold. The present invention does not predict but actually shuts down the signals or send an EOL signal when the signal has reached the end of its useful life.

SUMMARY OF THE INVENTION

The inventive signal addresses the problem of users being unable to fully take advantage of the longer LED life. The inventive signal comprises an intelligent diagnosis system inside the LED signal. The signal can self-extinguish or send a signal through its communication port at the end of its useful life when the LEDs are no longer providing the required light output. The inventive signal also utilizes the fact that LEDs put out more light and need less current at the beginning of their life than they do as they degrade over time. Over time, the LEDs need more current to maintain a given light output as they age. The control module in the LED signal provides a signal that increases the current so that the LED signal can continue to provide sufficient light output.

In the present invention, the LED signal is a stand-alone system. Voltage is still fed by the traffic controller, but the signal does not have any further interface with it. The inventive signal compiles a database of various parameters, such as temperature, hours of operation, light output etc. in order to accurately assess the signal's end of life and adjust the LED current to extend the signal's life.

The inventive signal uses a photosensor feedback primarily in order to detect end of life of the signal and to compensate for light output degradation by increasing LED current in order to extend the signal's life. The present invention preferably also has communication capabilities. The inventive signal measures the light output for the complete array, calculates the number of hours of operation and uses the measured data to determine end of life for the signal. The present invention does not predict the end of life, but actually shuts down the signals or send an EOL signal when the signal has reached the end of its useful life.

The inventive signal addresses the need to utilize the LED signal for its full useful life without sacrificing safety by incorporating intelligent diagnosis system inside the LED signal. The signal can self-extinguish or send a signal through its communication port at the end of its useful life when the LEDs are no longer providing the required light output. This invention will also take advantage of the fact that LEDs put out more light at the beginning of their lifer and need less current. They will need more current to maintain a given light output as they age.

In one aspect, an intelligent LED signal is illustrated. The intelligent LED signal includes a power supply, an LED array powered by the power supply, and a control module for controlling the signal wherein the control module is adapted to receive LED data and to generate control signals. The intelligent LED signal includes at least one LED data sensor that measures LED data. The at least one LED data sensor is a voltage sensor, a current sensor, a thermal sensor, a photosensor and/or a timer, and the LED data includes an input voltage, a temperature, an output current, a light output, an average input voltage, an average temperature, hours of operation of the LED array, and/or a lamp (or LED array) ID. In addition, the signal has a signal ID.

DETAILED DESCRIPTION OF THE INVENTION

The inventive signal is an LED signal, preferably an LED traffic signal, with a control module to measure traffic signal data and using that data determine the useful life of the Led signal.

Figure 1:
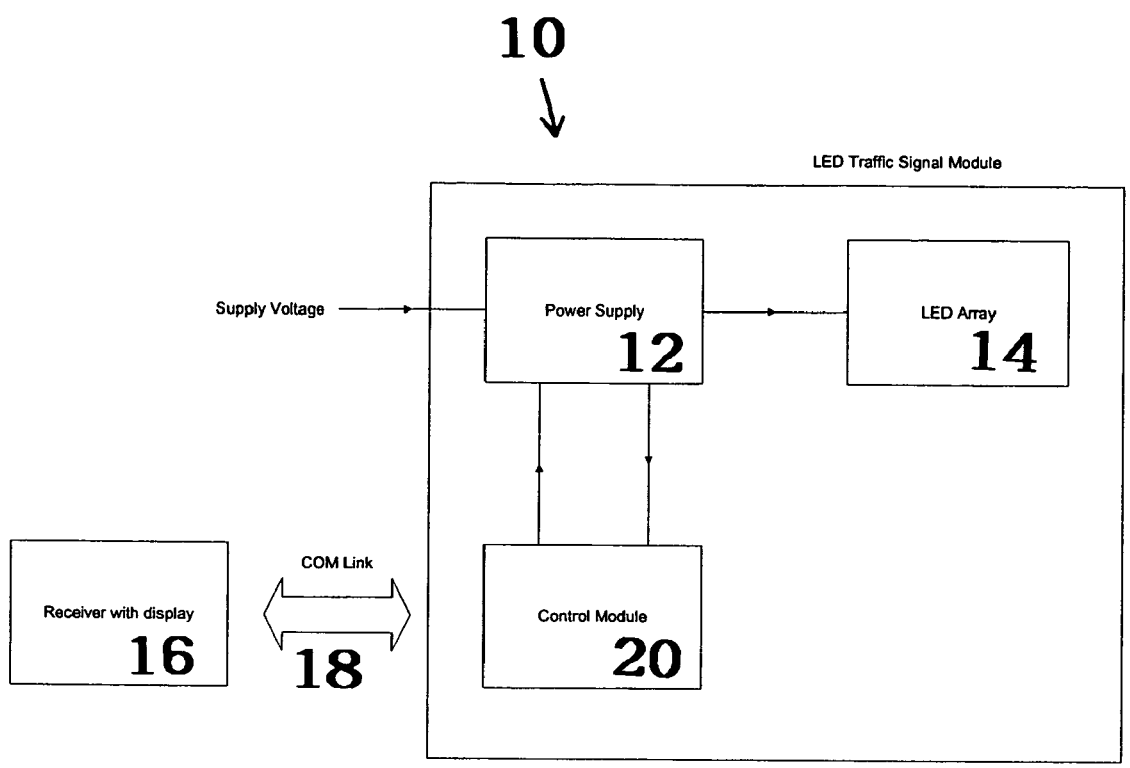
FIG. 1 is a block diagram of the inventive signal.

FIG. 1 is a block diagram of the LED traffic signal module 10. LED traffic signal module 10 comprises a power supply 12 regulating current through an LED array 14. The module further comprises a control module 20 inside the LED signal 10. Control module 20 performs all the checks, diagnosis and communication functions. An optional portable receiver 16 is to be used by authorized personnel in order to check the lamp status. Control module 20 has a communication link 18 allowing it to communicate with receiver 16. Receiver 16 preferably has a display. Optionally, receiver 16 can have a speaker or other broadcast capabilities. Receiver 16 can be provided with memory allowing data to be stored and later downloaded in a central location. Display can display one or more pieces of data. Preferably, the display shows Lamp ID 42, light output status 52 and number of hours of operation 48.

Figure 2:
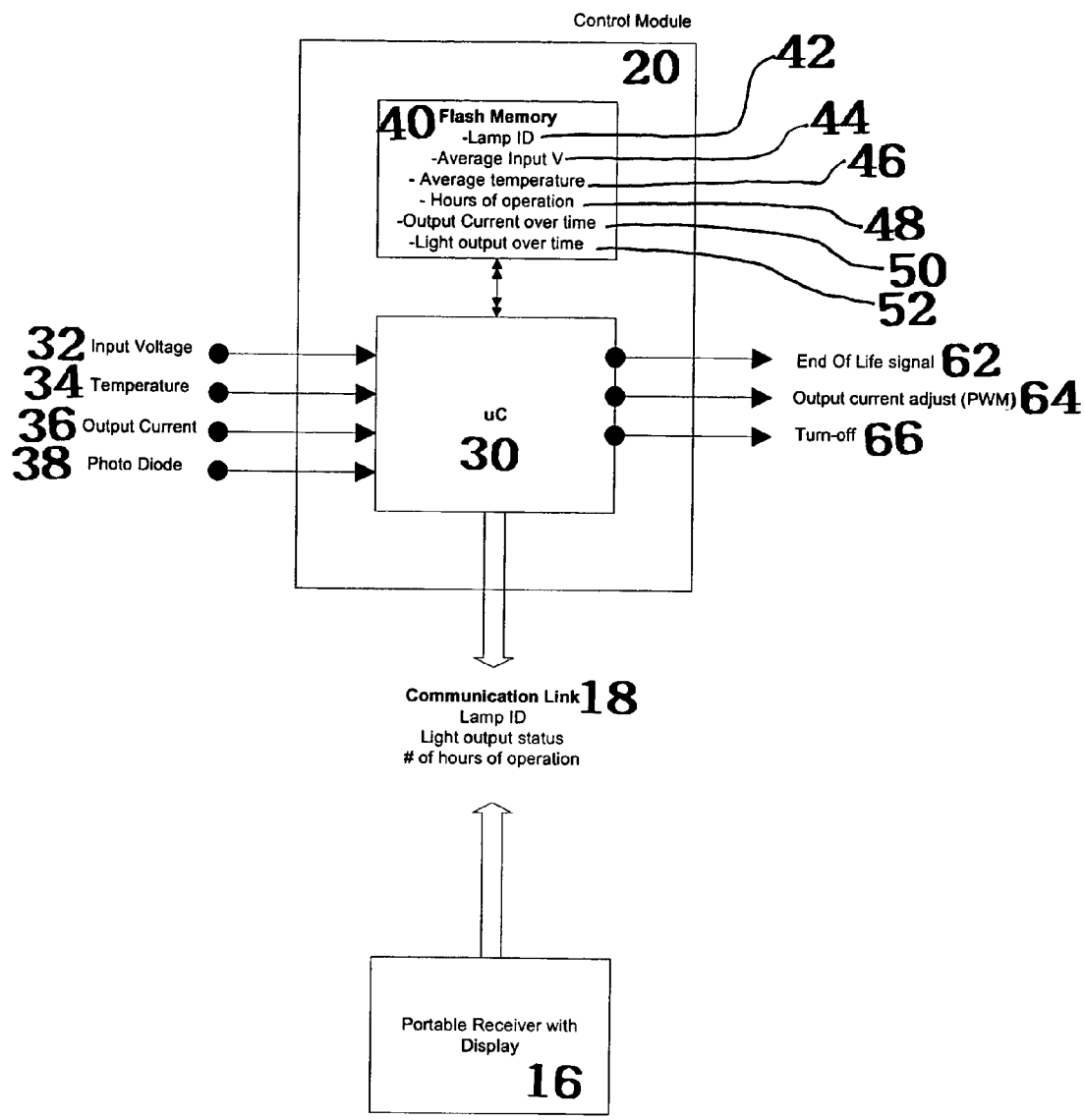
FIG. 2 is a schematic of the inventive control module.

Control module 20 is shown in FIG. 2. Microcontroller 30 samples at a first predetermined rate input voltage 32 and ambient temperature 34 and will compile average input voltage 44, average ambient temperature 46 and number of hours of operation 48. Microcontroller 30 also samples at a second predetermined rate output current 36 and light output 38. Light output 38 is measured by photo sensor or photo diode receiving light from the LED array 14 either directly or indirectly through some other light-collecting device.

Lamp data 32, 34, 36, 38 will be compiled in a table. Light output status 52 is determined using the lamp data 32, 34, 36 and 38. If light output cannot be maintained any more, the LED signal 10 either self-terminates 66 or sends an end-of-life signal 62. An example is given in Table 1.

Lamp ID 42 is an identification given to the lamp 14 for communication purposes. Average input voltage 44 is the average line voltage 32 supplied to the lamp. The input voltage 32 is sampled and average input voltage 44 is calculated and stored in the database or flash memory 40. Average ambient temperature 46 is the temperature seen by the LEDs 14 inside the signal module 10. A thermal sensor is fitted on the power supply PCB or on the LEDs PCB and an average temperature 46 is calculated throughout the signal's life. The number of hours of operation 48 is the number of hours of service for the LED array 14. A counter is incremented to keep track of the signal's life. Output current 36 and light output 38 are compiled over time. Output current 36 is obtained by sampling the LED current and storing the data at a fixed interval. Light output 38 is obtained by sampling the light output with a photo sensor receiving light from the LEDs either directly or indirectly through some other light-collecting device.

The end of life (EOL) signal 62 is derived by comparing the measured light output 38 sensor with a reference level. The reference level may be set by government regulation, the signals environment or be based on other factors. If light output 36 is lower than the reference level and if output current 36 cannot be adjusted anymore to and if number of hours of operation 48 at the average temperature 46 is higher than the minimum number of hours for a given average temperature, then EOL 62 is enabled. The EOL signal 62 activates an EOL circuit that shuts the signal or sends an EOL signal to receiver 16, traffic controller or other location or device.

If the light output 38 has fallen below the reference level and output current 36 is below a maximum current, output current adjust 64 provides a signal that increases output current 36 to maintain a sufficient light output. The turn off signal 66 turns the signal off if input voltage is under 35V.

Table 1 lists exemplary sampling and refresh rates and operational parameters for the inventive self-diagnosing signal. The sampling rates, refresh rates, and other operational parameters may be selected based on lamp color and/or application. The measured and calculated data is stored in the memory 40 of control module 20. Lamp ID 42 is preferably assigned at the factory. Input voltage 32 is measured more frequently than every 1 ms and average input voltage 44 is calculated. Ambient temperature 34 is measured more frequently than every 100 ms. Average ambient temperature 46 is calculated. An incremental timer keeps track of the number of hours of operation of the signal, the hours of operation is refreshed more frequently than every 1 ms. Output current 36 and light output 38 are measured after every 168 hours of operation. This LED signal data is used to determine whether to send and EOL signal 62, output current adjust 64, and/or to send turn-off signal 66. If the input voltage 32 is less than 35 V turn-off signal 66 is generated. If light output 38 is less than a minimum light output and output current 36 is less than a maximum current, an output current adjust signal 64 is generated. If the hours of operation 48 is greater than a calculated maximum number of hours and/or light output 38 is less than a minimum light output and current exceeds the maximum current, end of life signal 62 is generated. LED signal data including average temperature 46 are used to calculate the maximum number of hours.

TABLE 1

| Variable | Sampling Rate | Method of Determination |
| --- | --- | --- |
| Lamp ID | n/a | Factory assigned |
| Average Input Voltage | <1 ms | Average of samples of Input Voltage |
| Average Ambient Temperature | <100 ms | Average of samples of Ambient Temperature |
| Number of hours of operation | <1 ms | Increment timer |
| Output Current | 168 hours | Each sample of output current stored in a Table |
| Light Output | 168 hours | Each sample of light sensor stored in a Table |

| Control variables | Refresh Rate | Method of Determination |
| --- | --- | --- |
| End of Life signal (EOL) | 168 hours | If (nb of h > (Max h = f(Avg T))) AND (Light Output < Min) THEN EOL |
| Output Current Adjust | 168 hours | If (Light Output < Min) AND (I < Imax) THEN (Increment I) |
| Turn-off | n/a | If Vin < 35 V |

As the LEDs degrade, the control module in the LED signal provides an output current adjust signal 64 to increase the current so that the LED signal can continue to provide sufficient light output. Once the current no longer be increased, the inventive signal self-extinguishes or sends a EOL signal 62 through its communication port at the end of its useful life when the LEDs are no longer providing the required light output.

In the present invention, the LED signal is preferably a stand-alone system. Voltage is fed by the traffic controller, but the signal does not have any further interface with it. The inventive signal stores the various measured and calculated parameters preferably in a database to accurately assess the signal's end of life and adjust the LED current to extend the signal's life.

The invention claimed is:

1. A method of controlling a LED signal comprising the steps of:
    receiving LED data for one or more LEDs;
    generating a control signal in response to the LED data, wherein the LED data are, a light output, an average ambient temperature, and hours of operation of the LED array, and the control signal is an End of Life signal, wherein the End of Life signal is utilized to indicate end of life for at least one of the one or more LEDs; and
    calculating a maximum number of hours wherein said maximum number of hours is proportional to the average ambient temperature, comparing the hours of operation to the maximum number of hours, comparing the light output to a light output minimum, wherein if the light output is below the light output minimum and/or hours of operation is greater than the maximum number of hours generating the End of Life signal and if the light output is not below the light output minimum and/or the hours of operation are not greater than the maximum number of hours, incrementing a counter to continue sampling the light output and the hours of operation at a predefined interval.

2. The method of controlling a LED signal of claim 1, further comprising the steps of measuring the ambient temperature using a temperature sample rate and calculating an average ambient temperature.

3. The method of controlling a LED signal of claim 1, further comprising the steps of measuring the input voltage using a voltage sample rate and calculating an average input voltage.

4. The method of controlling a LED signal of claim 3, further comprising the steps of comparing the input voltage to a reference voltage and generating a turn-off signal if the input voltage is below the reference voltage.

5. The method of controlling a LED signal of claim 4, further comprising the step of turning off the signal in response to the turn-off signal.

6. The method of controlling a LED signal of claim 1, further comprising the step of measuring the output current using a current sample rate.

7. The method of controlling a LED signal of claim 6, further comprising the step of measuring the light output using a light output sample rate.

8. The method of controlling a LED signal of claim 7, further comprising the steps comparing the light output to a light output minimum and comparing the current to a current maximum, and if the light output is below the light output minimum and the output current is below the current maximum generating the current adjust signal.

9. The method of controlling a LED signal of claim 8, further comprising the step of increasing the output current in response to the current adjust signal.

10. The method of controlling a LED signal of claim 9, further comprising the steps of measuring the light output using a light output sample rate and timing the hours of operation.

11. The method of controlling a LED signal of claim 1, further comprising the step of measuring the light output using a light output sample rate.

12. The method of controlling a LED signal of claim 1, further comprising the step of timing the hours of operation.

13. The method of controlling a LED signal of claim 1, further comprising the steps communicating the End of Life signal to a receiver or turning-off the signal in response to the End of Life signal.

14. A method of controlling a LED signal comprising the steps of:
    receiving LED data, said LED data are voltage, ambient temperature, output current, light output, average input voltage, average ambient temperature, hours of operation of the LED array, and/or lamp ID and the control signal is an End of Life signal, wherein the End of Life signal is utilized to indicate end of life for at least one of the one or more LEDs;
    generating a control signal in response to the LED data;
    measuring the ambient temperature using a temperature sample rate;
    calculating the average ambient temperature;
    measuring the input voltage using a voltage sample rate;
    calculating the average input voltage;
    measuring the output current using a current sample rate;
    measuring the light output using a light output sample rate;
    timing the hours of operation;
    comparing the input voltage to a reference voltage and generating a turn-off signal if the input voltage is below the reference voltage;
    comparing the light output to a light output minimum, comparing the current to a current maximum, and if the light output is below the light output minimum and the output current is below the current maximum generating a current adjust signal and increasing the output current in response to the current adjust signal; and
    calculating a maximum number of hours, said maximum number of hours is proportional to the average ambient temperature, comparing the hours of operation to the maximum number of hours, comparing the light output to a light output minimum, wherein if the light output is below the light output minimum and/or hours of operation is greater than the maximum number of hours generating the End of Life signal and if the light output is not below the light output minimum and/or the hours of operation are not greater than the maximum number of hours, incrementing a counter to continue sampling the light output and the hours of operation at a predefined interval.

15. The method of controlling a LED signal of claim 14, further comprising the step of turning off the signal in response to the turn-off signal.

16. The method of controlling a LED signal of claim 14, further comprising the steps communicating the End of Life signal to a receiver or turning-off the signal in response to the End of Life signal.

17. The method of controlling a LED signal of claim 14, further comprising the step of saving the LED data to memory.

18. The method of controlling a LED signal of claim 14, wherein the current sample rate is predetermined and the light output sample rate is predetermined.

19. The method of controlling a LED signal of claim 14, wherein an output current adjust and end of life calculation are performed every time the output current and light output are sampled.

20. The method of controlling a LED signal of claim 14, wherein the current sample rate is predetermined, the light output sample rate is predetermined and an output current adjust and end of life calculation are performed every time the output current and light output are sampled.

21. The method of controlling a LED signal of claim 14, further comprising the step of communicating at least one LED data or at least one control signal to a receiver.

22. The method of controlling a LED signal of claim 14, wherein the voltage sample rate is at least one measurement every 1 ms and the temperature sample rate is at least one measurement every 100 ms.

23. The method of controlling a LED signal of claim 22, wherein the current sample rate is every 168 hours of operation, the light output sample rate is every 168 hours of operation and an output current adjust and end of life calculation are performed every time the output current and light output are sampled.

* * * * *